(12) United States Patent
Matsumoto et al.

(10) Patent No.: US 10,774,188 B2
(45) Date of Patent: Sep. 15, 2020

(54) MATERIAL AND FORMED ARTICLE (71) Applicant: Mitsubishi Gas Chemical Company, Inc., Tokyo (JP)

(72) Inventors: Nobuhiko Matsumoto, Hiratsuka (JP); Tomonori Kato, Hiratsuka (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 107 days.

(21) Appl. No.: 16/304,586

(22) PCT Filed: Apr. 17, 2017

(86) PCT No.: PCT/JP2017/015444
§ 371 (c)(1),
(2) Date: Nov. 26, 2018

(87) PCT Pub. No.: WO2017/203893
PCT Pub. Date: Nov. 30, 2017

(65) Prior Publication Data
US 2019/0300661 A1 Oct. 3, 2019

(30) Foreign Application Priority Data
May 27, 2016 (JP) .................................. 2016-105845

(51) Int. Cl.
*C08J 5/08* (2006.01)
*B32B 5/12* (2006.01)
(Continued)

(52) U.S. Cl.
CPC ................ *C08J 5/08* (2013.01); *B29C 70/06* (2013.01); *B29C 70/10* (2013.01); *B32B 5/02* (2013.01);
(Continued)

(58) Field of Classification Search
CPC ........... B32B 5/12; B32B 27/34; B29B 11/16; B29B 15/105; C09J 5/04; C09J 5/043;
(Continued)

(56) References Cited

U.S. PATENT DOCUMENTS 3,538,974 A 11/1970 Marzocchi
5,496,602 A * 3/1996 Wai ........................ B29B 11/16
428/298.1

(Continued)

FOREIGN PATENT DOCUMENTS

EP 2940065 A1 11/2015
EP 2982504 A1 2/2016
(Continued)

OTHER PUBLICATIONS

International Preliminary Report on Patentability and Written Opinion issued in PCT/JP2017/015444 dated Nov. 27, 2018 and English Translation (9 pages).

(Continued)

*Primary Examiner* — Catherine A. Simone
(74) *Attorney, Agent, or Firm* — Fitch, Even, Tabin & Flannery LLP (57) ABSTRACT

Provided is a material having large anti-piercing force and small surface roughness. The material contains continuous reinforcing fibers that are juxtaposed unidirectionally, and having a polyamide resin impregnated therein, wherein the continuous reinforcing fiber gives a non-circular cross sectional shape, when viewed perpendicularly to the longitudinal direction thereof, with a flatness ratio, given by long diameter (D2)/short diameter (D1), of 1.5 or larger, and in at least one cross section of the material taken perpendicularly to the direction of the continuous reinforcing fibers being juxtaposed, the percentage of area occupied by the continuous reinforcing fibers, whose long diameter (D2) lying at an (Continued)

angle of less than 20 degrees away from the direction of the continuous reinforcing fibers being juxtaposed, is 30 to 90% by area of the continuous reinforcing fibers.

20 Claims, 3 Drawing Sheets

(51) Int. Cl.
    *B32B 27/34*     (2006.01)
    *C08G 69/26*     (2006.01)
    *C08J 5/04*     (2006.01)
    *B32B 5/02*     (2006.01)
    *B29C 70/06*     (2006.01)
    *B29C 70/10*     (2006.01)
    *B29K 77/00*     (2006.01)
    *B29K 105/08*     (2006.01)
    *B29K 309/08*     (2006.01)

(52) U.S. Cl.
    CPC ................ *B32B 5/12* (2013.01); *B32B 27/34* (2013.01); *C08G 69/26* (2013.01); *C08G 69/265* (2013.01); *C08J 5/04* (2013.01); *B29K 2077/00* (2013.01); *B29K 2105/0881* (2013.01); *B29K 2309/08* (2013.01); *B32B 2262/101* (2013.01); *C08J 2377/06* (2013.01); *C08J 2377/08* (2013.01)

(58) Field of Classification Search
    CPC .... C09J 5/08; C09J 5/24; B29C 70/04; B29C 70/06; B29C 70/083; B29C 70/085; B29C 70/10; B29C 70/20; B29C 70/16; B29C 70/205; Y10T 428/24124; Y10T 428/249933; Y10T 428/249934; Y10T 428/249942; Y10T 428/24994; Y10T 428/249946
    See application file for complete search history.

(56) References Cited

U.S. PATENT DOCUMENTS

| | | |
|---|---|---|
| 2015/0266260 A1 | 9/2015 | Fujioka et al. |
| 2018/0162073 A1 | 6/2018 | Fujiura et al. |

FOREIGN PATENT DOCUMENTS

| | | |
|---|---|---|
| JP | H06-000817 A | 1/1994 |
| JP | 2004-238615 A | 8/2004 |
| JP | 2004-250570 A | 9/2004 |
| JP | 2015-224313 A | 12/2015 |
| WO | 2016/190194 A1 | 12/2016 |

OTHER PUBLICATIONS

International Search Report for PCT/JP2017/015441 dated Jul. 11, 2017and English Translation (5 pages).
Extended European Search Report issued in corresponding EP Application No. 17802492.3 dated Apr. 29, 2019 (5 pages).

* cited by examiner

MATERIAL AND FORMED ARTICLE

CROSS-REFERENCE TO RELATED APPLICATIONS

This application is a U.S. national phase application filed under 35 U.S.C. § 371 of International Application PCT/JP2017/015444, filed Apr. 17, 2017, designating the United States, which claims priority from Japanese Application Number 2016-105845, filed May 27, 2016.

FIELD OF THE INVENTION

This invention relates to a material having a polyamide resin and a continuous reinforcing fiber used therein, and a formed article obtained by using the material, and in particular to a material suitably used for a UD tape.

BACKGROUND OF THE INVENTION

Polyamide resin has been applied in a wide variety of fields including electric equipment, electronic equipment, precision machine, automobile parts, building material and miscellaneous goods, for its excellent features including easiness of forming or molding, appearance, economy, mechanical strength, and physical and chemical properties. For example, Patent Literature 1 discloses a fiber-reinforced resin material that includes a continuous reinforcing fiber impregnated with a thermoplastic resin composition that contains a polyamide resin and a flame retardant.

CITATION LIST

Patent Literature

[Patent Literature 1] JP-A-2015-224313

SUMMARY OF THE INVENTION

In some recent applications, there are occasional needs for materials with high anti-piercing force. Also materials having a continuous reinforcing fiber mixed therein are increasingly required to have small surface roughness.

This invention is aimed at solving the aforementioned problems, and at providing a material having large anti-piercing force and small surface roughness.

Solution to Problem

Considering the aforementioned problems, the present inventors found after investigations that the problems may be solved by using the continuous reinforcing fiber with a flattened cross sectional shape, and by controlling orientation of the cross section of the continuous reinforcing fiber to a predetermined degree in the material. More specifically, the aforementioned problem was found to be solved by means <1> below, and more preferably by means <2> to <13>.

<1> A material comprising continuous reinforcing fibers that are juxtaposed unidirectionally, and having a polyamide resin impregnated therein, wherein the continuous reinforcing fiber gives a non-circular cross sectional shape, when viewed perpendicularly to the longitudinal direction thereof, with a flatness ratio, given by long diameter (D2)/short diameter (D1), of 1.5 or larger, and in at least one cross section of the material taken perpendicularly to the direction of the continuous reinforcing fibers being juxtaposed, the percentage of area occupied by the continuous reinforcing fibers, whose long diameter (D2) lying at an angle of less than 20 degrees away from the direction of the continuous reinforcing fibers being juxtaposed, is 30 to 90% by area of the continuous reinforcing fibers.

<2> The material of <1>, wherein, in at least one cross section of the material taken perpendicularly to the direction of the continuous reinforcing fibers being juxtaposed, the percentage of area occupied by the continuous reinforcing fibers, whose long diameter (D2) lying at an angle of 70 degrees or larger away from the direction of the continuous reinforcing fibers being juxtaposed, is 70 to 5% by area of the continuous reinforcing fiber.

<3> The material of <1> or <2>, wherein the continuous reinforcing fiber is a glass fiber.

<4> The material of any one of <1> to <3>, wherein the continuous reinforcing fiber has a cross sectional area, when viewed perpendicularly to the longitudinal direction, of 15 to 2000 µm² per a single continuous reinforcing fiber.

<5> The material of anyone of <1> to <4>, wherein the flatness ratio is 1.5 to 8.

<6> The material of any one of <1> to <5>, wherein the material has a thickness of 10 to 2000 µm.

<7> The material of any one of <1> to <6>, wherein the polyamide resin contains a structural unit derived from diamine and a structural unit derived from dicarboxylic acid, and 50 mol % or more of the structural unit derived from diamine is derived from xylylenediamine.

<8> The material of any one of <1> to <7>, wherein the continuous reinforcing fiber accounts for 30 to 80% by mass of the material.

<9> The material of anyone of <1> to <8>, having a surface roughness Ra of 22 µm or smaller.

<10> The material of any one of <1> to <9>, having an anti-piercing force of 8.5 N; where the anti-piercing force is given as an averaged maximum force from measurements repeated five times, wherein a needle with a 40 µm diameter tip, attached to a strograph, is allowed to poke the material at a speed of 20 mm/s perpendicularly to the direction the continuous reinforcing fibers are juxtaposed, to find the maximum force at which the needle just pierces the material.

<11> The material of anyone of <1> to <10>, having an a tear resistance of 2.5 N or larger; where the tear resistance is given as an averaged maximum force from measurements repeated five times, wherein the material is cut in 50 mm long in the fiber-length direction, a pair of resin films of 15 mm wide, 70 mm long and 100 µm thick are bonded one by one onto the top and bottom surfaces of the material with an adhesive, so as to overlap the resin films over a length of 20 mm, while aligning one longitudinal side of the resin films in agreement with the center line of the material in the fiber-length direction, and residual portions of the resin films are bonded to each other with an adhesive; another pair of resin films are bonded to the material in the same way as the aforementioned pair of resin films, while aligning one longitudinal side of the resin films in agreement with the center line of the material in the fiber-length direction; and the individual pairs of resin films are pulled in the directions 180 degrees away from each other at a tensile speed of 300 mm/min, to find the maximum force at which the material tears in the fiber-length direction.

<12> The material of any one of <1> to <11>, being a UD tape.

<13> A formed article obtained by forming the material described in any one of <1> to <12>.

According to this invention, it now became possible to provide a material having large anti-piercing force and small surface roughness, and also to provide an excellent formed article using such material.

DESCRIPTION OF EMBODIMENTS

This invention will be detailed below. Note that all numerical ranges given in this specification, using "to" preceded and succeeded by numerals, are used to represent the ranges including these numerals respectively as the lower and upper limit values.

In this specification, UD tape is an abbreviation of Uni-Directional tape, which is a unidirectional reinforced material.

Figure 1:
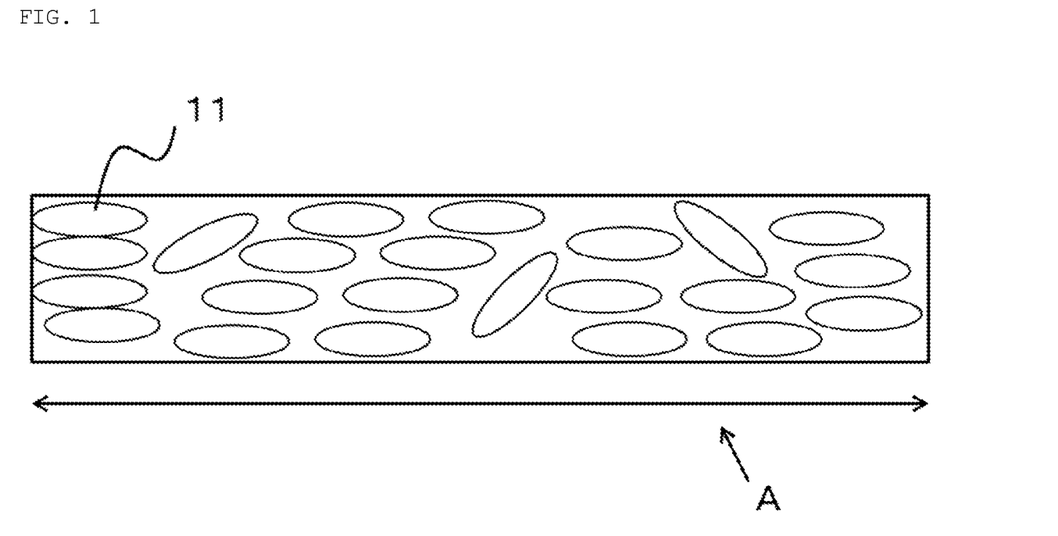
FIG. 1 is a schematic cross sectional view illustrating a material of this invention.

The material of this invention includes continuous reinforcing fibers that are juxtaposed unidirectionally, and having a polyamide resin impregnated therein, wherein the continuous reinforcing fiber gives a non-circular cross sectional shape, when viewed perpendicularly to the longitudinal direction thereof, with a flatness ratio, given by long diameter (D2)/short diameter (D1), of 1.5 or larger; and in at least one cross section of the material taken perpendicularly to the direction of the continuous reinforcing fibers being juxtaposed, the percentage of area occupied by the continuous reinforcing fibers, whose long diameter (D2) lying at an angle (occasionally referred to as "angle α", hereinafter) of less than 20 degrees away from the direction of the continuous reinforcing fibers being juxtaposed, is 30 to 90% by area of the continuous reinforcing fibers. For example, as illustrated in FIG. 1, when viewed in a cross section of the material, a part of the non-circular cross sections of the continuous reinforcing fibers are oriented obliquely to the material surface. With such design, the material having large anti-piercing force and small surface roughness will be obtained.

The reason may considered as follows. When the percentage of area occupied by the continuous reinforcing fibers with an angle α of smaller than 20 degrees exceeds 90% by area, there will be less number of continuous reinforcing fibers that lie across a path along which an article to be pierced travels. Decrease in the number of fibers reduces polyamide resin/continuous reinforcing fiber boundaries which markedly affect strength of the composite material, and thereby reduces the anti-piercing force. Meanwhile, when the percentage of area occupied by the continuous reinforcing fibers with an angle α of smaller than 20 degrees is less than 30% by area, the shape of continuous reinforcing fibers will affect the surface geometry, and will increase the surface roughness Ra. In order to reduce Ra, a special treatment will be necessary in the process of impregnating the polyamide resin so as to fill up gaps between the continuous reinforcing fibers for smoothening, for example by fluidizing the polyamide resin, or extending the time of impregnation.

In addition, with the design of this invention, it now becomes possible to obtain the material having large tear resistance, less likely to cause separation of the continuous reinforcing fibers, and easy to unwound.

By making the continuous reinforcing fiber less likely to separate, the fiber will effectively be prevented from being broken and dropped, and thereby the process environment will be prevented from being polluted. The resultant formed article will have improved appearance and improved mechanical strength.

The material of this invention is also beneficial in the form of material-winding body, which can easily be unwound, while effectively suppressing the material from adhering to the upper layer and the lower layer of the material. The material of this invention also has high moisture resistance owing to its geometry, and can thereby improve moisture resistance of the material-winding body.

Figure 2:
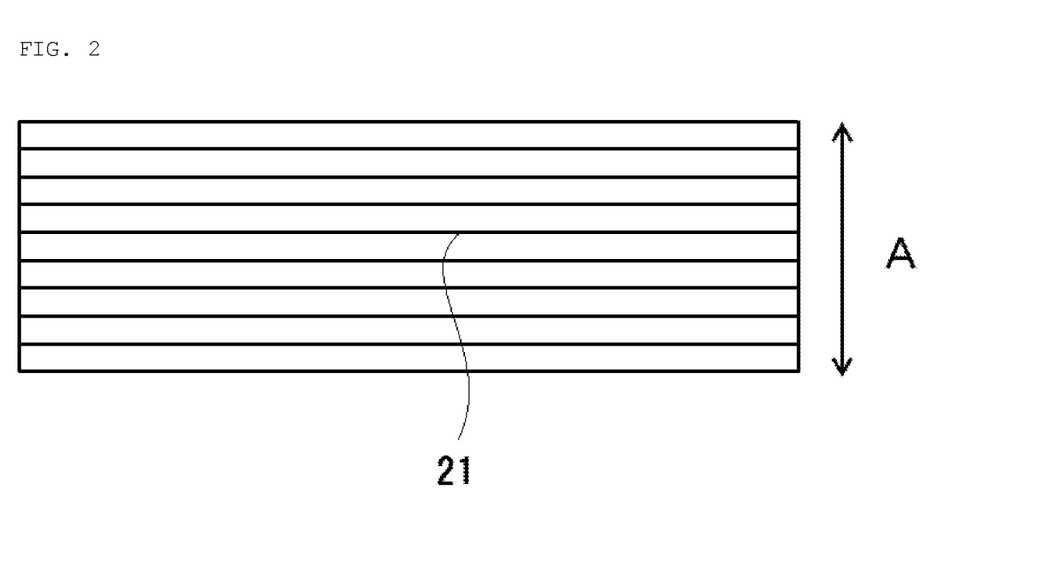
FIG. 2 is a schematic drawing illustrating the material of this invention having the continuous reinforcing fibers juxtaposed unidirectionally.

The material of this invention has therein the continuous reinforcing fibers juxtaposed unidirectionally. The phrase " . . . juxtaposed unidirectionally" means that, typically as illustrated in FIG. 2, continuous reinforcing fibers 21 are arranged side by side in the same direction along the longitudinal direction (fiber-length direction) of the continuous reinforcing fibers. "The same direction" in this context means not only a mathematically equal direction, but of course also allows the cases where the continuous reinforcing fibers have some disturbance or shift in the state of juxtaposition, without departing from the spirit of this invention. For example, any disturbance or shift in the continuous reinforcing fibers to an extent that is possibly found in commercially available UD tape, is acceptable as the same direction in the context of this invention.

Figure 3:
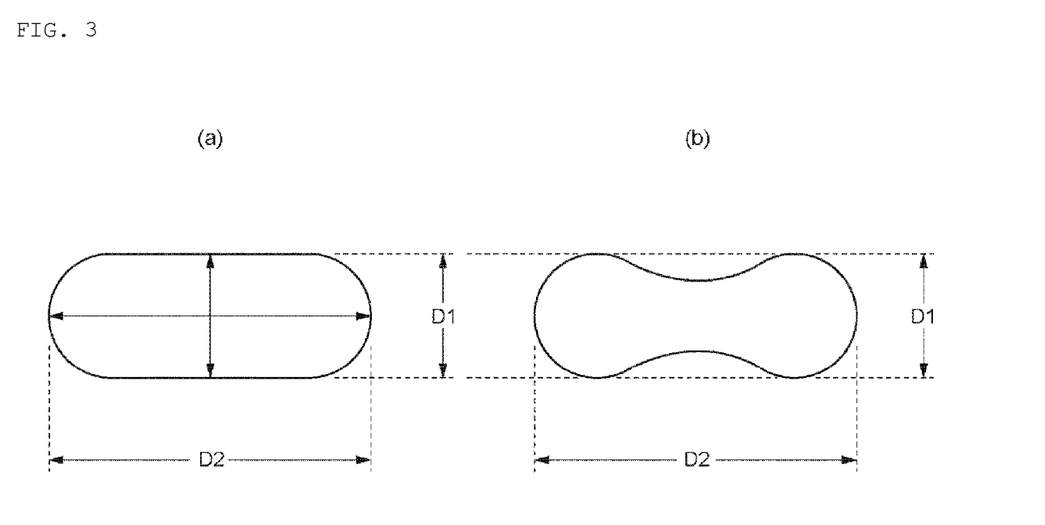
FIG. 3 is a schematic drawing illustrating the long diameter (D2) and the short diameter (D1) defined in cross sections of the continuous reinforcing fibers.

The continuous reinforcing fiber used in this invention gives a non-circular cross sectional shape, when viewed perpendicularly to the longitudinal direction thereof, with a flatness ratio, given by long diameter (D2)/short diameter (D1), of 1.5 or larger. "Non-circular cross sectional shape" is exemplified by oblong, elliptic and cocoon-like cross sections, wherein oblong shape is more preferable. Oblong, elliptic and cocoon-like shapes are, of course, not only those in a mathematical sense, but also those containing some errors without departing from the spirit of this invention. For example, if there should be an error to an extent that is possibly found in commercially available continuous reinforcing fiber nominally having a non-circular cross section such as oblong, elliptic or cocoon-like cross section, also this sort of shape is understood to be non-circular in the context of this invention. In this invention, the longest part of the cross section is defined as the long diameter, and the section that lies in the direction perpendicular to the long diameter is defined as the short diameter. For an exemplary case of oblong cross section, the long diameter (D2) and the short diameter (D1) are determined as illustrated in FIG. 3(a). For another exemplary case of cocoon-like cross section, the long diameter (D2) and the short diameter (D1) are determined as illustrated in FIG. 3(b).

The flatness ratio in this invention is measured in such a way that freely selected five regions (five fibers), in a cross section taken perpendicularly to the longitudinal direction of the continuous reinforcing fiber, are observed under an optical microscope to find the long diameters (D2) and the short diameters (D1), and the measured values are then averaged.

Only one type of the continuous reinforcing fiber may be used independently, or two or more types of them may be used. When two or more types of continuous reinforcing fibers are used, they may have different values of flatness ratio. The flatness ratio in this case is given by a weighted average of flatness ratio values of the individual continuous reinforcing fibers, based on the individual contents of the continuous reinforcing fibers.

The flatness ratio is 1.5 or larger, preferably 1.8 or larger, and more preferably 2.0 or larger. The upper limit of flatness ratio is preferably 8 or smaller, more preferably 7 or smaller, and even more preferably 6 or smaller. The continuous reinforcing fibers contained in the material of this invention are typically such that, when viewed in a cross section taken perpendicularly to the direction the continuous reinforcing fibers are juxtaposed, those having a flatness ratio of 1.2 or larger occupy 90% or more of the area, and more preferably such that those having a flatness ratio of 1.5 or larger occupy 90% or more of the area.

The continuous reinforcing fiber used in this invention preferably has a long diameter (D2) of 6 to 100 μm, which is more preferably 10 to 80 μm, even more preferably 15 to 40 μm, and yet more preferably 20 to 35 μm. The continuous reinforcing fiber used in this invention preferably has a short diameter (D1) of 3 to 20 μm, which is more preferably 5 to 15 μm, and even more preferably 5 to 10 μm. Within these ranges, obtainable is a material that excels in formability, while keeping an ability to yield a formed article with high mechanical strength.

The continuous reinforcing fiber used in this invention preferably gives a cross sectional area, when viewed perpendicularly to the longitudinal direction, of 15 to 2000 μm$^2$ per a single continuous reinforcing fiber, which is more preferably 20 to 1500 μm$^2$, even more preferably 50 to 500 μm$^2$, and yet more preferably 80 to 250 μm$^2$. The cross section may be measured using image processing software such as ImageJ. When there are two or more cross sectional shapes, the area is given by an average value (number average value) of the areas of feely selected 100 cross sections.

Materials, etc. of the continuous reinforcing fiber will be detailed later.

The material of this invention is such that, when viewed in at least one cross section of the material taken perpendicularly to the direction the continuous reinforcing fibers are juxtaposed, a part of the continuous reinforcing fibers are oriented so that the long diameter (D2) thereof lies at an angle of less than 20 degrees away from the direction the continuous reinforcing fibers are juxtaposed.

Now, the direction perpendicular to the direction of the continuous reinforcing fibers are juxtaposed, is determined in such a way that an arbitrary selected one layer composed of the continuous reinforcing fibers in the material is cut in the direction perpendicular to the direction of the continuous reinforcing fibers being juxtaposed, wherein the direction corresponded to such arbitrary selected one layer that appears in the cross section is defined as the direction in concern. In the case where the material is manufactured by using rolls and spreaders, while opening the continuous reinforcing fibers as described later in EXAMPLES, the surface in the cross section of the material would correspond to the direction perpendicular to the direction of the continuous reinforcing fibers being juxtaposed.

Figure 4:
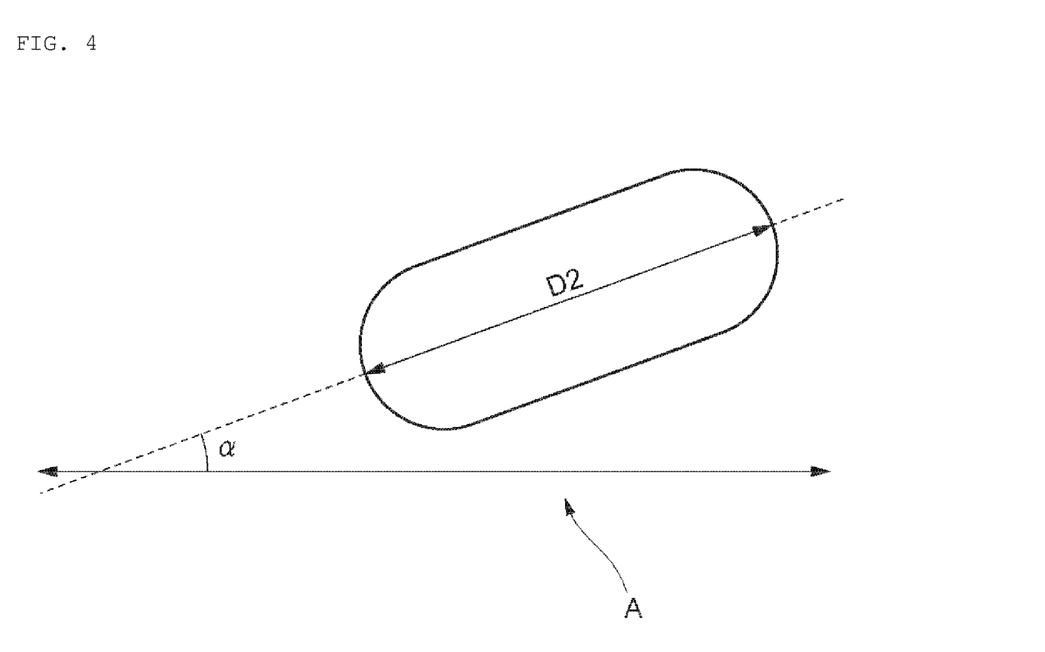
FIG. 4 is a schematic drawing illustrating an angular relation between the direction perpendicular to the direction the continuous reinforcing fibers are juxtaposed, and the long diameter of the continuous reinforcing fiber, in the material of this invention.

In the material of this invention, angle $\alpha$ between the direction perpendicular to the direction the continuous reinforcing fibers are juxtaposed, and the long diameter (D2) of the continuous reinforcing fiber, is typically as illustrated in FIG. 4. In FIG. 4, "A" represents the direction perpendicular to the direction the continuous reinforcing fibers are juxtaposed, and D2 represents the long diameter of the continuous reinforcing fiber. While two angles are made between "A" and the long diameter (D2), the smaller one is defined as angle $\alpha$ in this invention.

The percentage of area occupied by the continuous reinforcing fibers, with an angle $\alpha$ of smaller than 20 degrees, in the cross section of the continuous reinforcing fiber in the material of this invention is 30% by area or above at the lowest, which is preferably 35% by area or above. Meanwhile the percentage of the cross section is 90% by area or below at the highest, which is more preferably 80% by area or below, and even more preferably 70% by area or below.

In this invention, the percentage of area of cross section of the continuous reinforcing fibers, whose angle $\alpha$ is 70 degrees or larger, is more preferably 70 to 5% by area. Within such range, the material will be suitably balanced between more improved surface smoothness and more improved anti-piercing force. The percentage of area of cross section of the continuous reinforcing fibers, whose angle $\alpha$ is 70 degrees or larger, in the material of this invention is 5% by area or above at the lowest, which is more preferably 10% by area or above, and even more preferably 15% by area or above. Meanwhile, the percentage of area is 70% by area or below at the highest, which is more preferably 50% by area or below, even more preferably 40% by area or below, yet more preferably 30% by area or below, and furthermore preferably 25% by area or below.

In this invention, the percentage of area of cross section of the continuous reinforcing fibers, whose angle $\alpha$ is 20 degrees or larger and smaller than 70 degrees, may be 25 to 80% by area, which may be 25 to 50% by area, and even may be 30 to 40% by area.

In this invention, although it suffices that such relation regarding angle $\alpha$ is satisfied in at least one cross section taken perpendicularly to the direction the continuous reinforcing fibers are juxtaposed, it is more preferable that such relation regarding angle $\alpha$ is satisfied in five or more cross sections.

The method for measuring angle $\alpha$ will follow the description later in EXAMPLES. If instruments described in EXAMPLES were no more available for discontinuation or other reasons, any instruments with equivalent performances may be used. The same will apply to the methods described in EXAMPLES below.

The material of this invention typically has a flat form such as tape, film or sheet. In particular in this invention, the material is suitably used as a UD tape. The material of this invention is wound up around a core or the like, and marketed in a product form of spool. In the process of winding, the material is preferably wound up in the fiber-length direction (longitudinal direction) of the continuous reinforcing fiber. Since the material of this invention is easy to unwound, so that it can suitably be stored in the form of material-winding body.

The material of this invention preferably has a thickness of 10 μm or above at the thinnest, which is more preferably 50 μm or above, more preferably 100 μm or above, and particularly 150 μm or above. Meanwhile the thickness is 2 mm (2000 μm) or below at the thickest, which is more preferably 1 mm or below, even more preferably 500 μm or below, and particularly 250 μm or below. Now, the thickness is given by an average of measured values obtained at five freely selected points in the material of this invention.

The thickness and length of the material of this invention are not specifically limited. For example, a UD tape may have a width of 1 to 100 cm, and a length of 1 to 1000 m.

In the material of this invention, the polyamide resin is impregnated into the continuous reinforcing fibers. In this invention, the state of impregnation may be confirmed by embedding the continuous reinforcing fiber in an epoxy resin; cutting the embedded material in a direction perpendicular to the longitudinal direction of the continuous reinforcing fibers and polishing the cross section; and then photographing the cross section under a ultra-deep color 3D shape analyzing microscope VK-9500 (control unit)/VK-9510 (measurement unit) (from Keyence Corporation)).

For measurement of the ratio of impregnation, on the thus obtained cross-sectional image of the material, regions where the polyamide resin is melt and impregnated are picked up using image analyzing software "Image)", and the areas are measured.

Ratio of impregnation=[(Area of regions having polyamide resin impregnated into continuous reinforcing fibers in photographed cross section)/(Area of photographed cross section)]×100 (in %).

In this invention, the ratio of impregnation is preferably 70% or above, more preferably 80% or above, and yet more preferably 90% or above.

The material of this invention preferably has a surface roughness Ra of 22 μm or smaller, which is more preferably 21 μm or smaller, and even more preferably 20 μm or smaller. The lower limit of the surface roughness is preferably 0 μm, but may be practical enough if it were 5 μm or above, and even 8 μm or above. Method for measuring the surface roughness will follow a method described later in EXAMPLES.

The material of this invention preferably has an anti-piercing force of 8.5 N or larger. The upper limit of anti-piercing force is not specifically limited, but may be practical enough if it were 15 N or smaller, and even 12 N or smaller. The anti-piercing force is a value measured by the method below, and more specifically, the method described later in EXAMPLES.

<Anti-Piercing Force>

The anti-piercing force is given as an averaged maximum force from measurements repeated five times, wherein a needle with a 40 μm diameter tip, attached to a strograph, is allowed to poke the material at a speed of 20 mm/s perpendicularly to the direction the continuous reinforcing fibers are juxtaposed, to find the maximum force at which the needle just pierces the material.

The material of this invention preferably has a tear resistance of 2.5 N or larger, which is more preferably 2.6 N or larger. The upper limit of tear resistance is not specifically limited, but may be practical enough if it were 5 N or smaller, and even 4 N or smaller. The tear resistance is a value measured by the method below, and more specifically, the method descried later in EXAMPLES.

<Tear Resistance>

The tear resistance is given as an averaged maximum force from measurements repeated five times, wherein the material is cut in 50 mm long in the fiber-length direction, a pair of resin films of 15 mm wide, 70 mm long and 100 μm thick are bonded one by one onto the top and bottom surfaces of the material with an adhesive, so as to overlap them over a length of 20 mm, while aligning one longitudinal side of the resin films in agreement with the center line of the material in the fiber-length direction, and residual portions of the films are bonded to each other; another pair of resin films are bonded to the material in the same way as the aforementioned pair of resin films, while aligning one longitudinal side of the resin films in agreement with the center line of the material in the fiber-length direction; and the individual pairs of resin films are pulled in the directions 180 degrees away from each other at a tensile speed of 300 mm/min, to find the maximum force at which the material tears in the fiber-length direction.

<Polyamide Resin>

The polyamide resin used in this invention will be explained.

The polyamide resin used in this invention is exemplified by polyamide 4, polyamide 6, polyamide 11, polyamide 12, polyamide 46, polyamide 66, polyamide 610, polyamide 612, polyhexamethylene terephthalamide (polyamide 6T), polyhexamethylene isophthalamide (polyamide 6I), polyamide 66/6T, polyxylylene adipamide, polyxylylene sebacamide, polyxylylene dodecamide, polyamide 9T, polyamide 9MT, polyamide 6I/6T; polyamide composed of 1,3-bis(aminomethyl)cyclohexane and adipic acid(polyamide 1,3-BAC6), polyamide 1,3-BAC6I; polyamide composed of 1,3-bis(aminomethyl)cyclohexane and sebacic acid (polyamide 1,3-BAC10), polyamide 1,3-BAC10I, polyamide 1,4-BAC6, polyamide 1,4-BAC6I, polyamide 1,4-BAC10, polyamide xylylene 6I, polyamide xylylene 10I, copolymers containing one or more types of these polyamides, and mixtures of these polyamides.

Among the aforementioned polyamide resins, from the viewpoints of formability and heat resistance, preferable is a polyamide resin having a structural unit derived from diamine and a structural unit derived from dicarboxylic acid, wherein 50 mol % or more of the structural unit derived from diamine is derived from xylylenediamine (referred to as "XD-based polyamide", hereinafter). By using low water absorption polyamides such as XD-based polyamide, polyamide 11 and polyamide 12, the obtainable 3D structure will more effectively be suppressed from foaming.

When the polyamide resin is a mixture, ratio of the XD-based polyamide in the polyamide resin is preferably 50% by weight or above, and more preferably 80% by weight or above.

In the XD-based polyamide, preferably 70 mol % or more of the structural unit derived from diamine is derived from metaxylylenediamine and/or paraxylylenediamine, which is more preferably 80 mol % or more, even more preferably 90 mol % or more, and particularly 95 mol % or more; meanwhile preferably 50 mol % or more of the structural unit derived from dicarboxylic acid is derived from a straight chain aliphatic α,ω-dicarboxylic acid having 4 to 20 carbon atoms, which is more preferably 70 mol % or more, even more preferably 80 mol % or more, yet more preferably 90 mol %, and furthermore preferably 95 mol % or more.

Diamines usable as the starting diamine component for the XD-based polyamide, but other than metaxylylenediamine and paraxylylenediamine, are exemplified by aliphatic diamines such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethyl-hexamethylenediamine, and 2,4,4-trimethyl-hexamethylenediamine; alicyclic diamines such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2- bis(4-aminocyclohexyl)propane, bis(aminomethyl)decalin, and bis(aminomethyl)tricyclodecane; and aromatic diamines such as bis(4-aminophenyl) ether, paraphenylenediamine, and bis(aminomethyl)naphthalene. Each of them may be used independently, or two or more of them may be used in a mixed manner.

When the diamine other than xylylenediamine is used as the diamine component, the ratio of use thereof is less than 50 mol % of the structural unit derived from diamine, which is preferably 30 mol % or less, more preferably 1 to 25 mol %, and particularly 5 to 20 mol %.

The straight chain aliphatic α,ω-dicarboxylic acid having 4 to 20 carbon atoms, suitably used for the starting dicarboxylic acid component of the polyamide resin, is exemplified by aliphatic dicarboxylic acids such as succinic acid, glutaric acid, pimelic acid, suberic acid, azelaic acid, adipic acid, sebacic acid, undecanedioic acid, and dodecanedioic acid. Each of them may be used independently or two or more of them may be used in a mixed manner. Among them, adipic acid or sebacic acid is preferable, since the polyamide resin will have the melting point within a suitable range for forming. Adipic acid is more preferable.

The dicarboxylic acid component other than the straight chain aliphatic α,ω-dicarboxylic acid having 4 to 20 carbon atoms is exemplified by phthalic acids such as isophthalic acid, terephthalic acid and orthophthalic acid; and isomers of naphthalenedicarboxylic acid such as 1,2-naphthalenedicarboxylic acid, 1,3-naphthalenedicarboxylic acid, 1,4-naphthalenedicarboxylic acid, 1,5-naphthalenedicarboxylic acid, 1,6-naphthalenedicarboxylic acid, 1,7-naphthalenedicarboxylic acid, 1,8-naphthalenedicarboxylic acid, 2,3-naphthalenedicarboxylic acid, 2,6-naphthalenedicarboxylic acid, 2,7-naphthalenedicarboxylic acid. Each of them may be used independently, or two or more of them may be used in a mixed manner.

When the dicarboxylic acid, other than the straight chain aliphatic α,ω-dicarboxylic acid having 4 to 20 carbon atoms, is used as the dicarboxylic acid component, terephthalic acid or isophthalic acid is preferably used in view of formability and barrier performance. Ratios of terephthalic acid or isophthalic acid is preferably 30 mol % or less of the structural unit derived from dicarboxylic acid, which is more preferably within the range from 1 to 30 mol %, and even more preferably within the range from 5 to 20 mol %.

Besides the diamine component and the dicarboxylic acid component, it is also possible to use, as a copolymerization component for composing the polyamide resin, lactams such as s-caprolactam and laurolactam; and aliphatic aminocarboxylic acids such as aminocaproic acid and aminoundecanoic acid, without adversely affecting the effect of this invention.

The polyamide resin used in this invention preferably has a number-average molecular weight (Mn) of 6,000 to 30,000, which is more preferably 8,000 to 28,000, even more preferably 9,000 to 26,000, yet more preferably 10,000 to 24,000, and furthermore preferably 11,000 to 22,000. Within these ranges, the heat resistance, elastic modulus, dimensional stability, and formability will further be improved.

The number-average molecular weight (Mn) is calculated by the equation below, using the terminal amino group concentration [$NH_2$] (microequivalent/g) and a terminal carboxy group concentration [COOH] (microequivalent/g):

Number–average molecular weight of polyamide resin(Mn)=2,000,000/([COOH]+[$NH_2$])

The polyamide resin used in this invention preferably has a polydispersity (weight-average molecular weight/number-average molecular weight (Mw/Mn)) of 1.8 to 3.1. The polydispersity is more preferably 1.9 to 3.0, and even more preferably 2.0 to 2.9. With the polydispersity controlled within these ranges, a 3D structure that excels in mechanical characteristics will more likely be obtained.

The polydispersity of polyamide resin is controllable by making a suitable choice, for example, on types and amounts of initiator or catalyst used for polymerization, and polymerization conditions including reaction temperature, pressure and time. Alternatively, it is also controllable by mixing two or more types of polyamide resins with different average molecular weights obtained under different polymerization conditions, or by subjecting the polyamide resin after polymerization to fractional precipitation.

The polydispersity may be determined by GPC measurement. More specifically, employable are a measuring instrument "HLC-8320GPC" from Tosoh Corporation, two "TSKgel Super HM-H" columns from Tosoh Corporation, a sodium trifluoroacetate solution (10 mmol/L) in hexafluoroisopropanol (HFIP) as an eluent, wherein the measurement may be carried out with a resin concentration of 0.02% by mass, a column temperature of 40° C., and a flow rate of 0.3 mL/min, using a refractive index (RI) detector. The polydispersity may be determined referring to standard polymethyl methacrylate (PMMA) equivalent values. The analytical curve may be prepared by using PMMA dissolved in HFIP, with the concentration varied over 6 levels.

The polyamide resin suitably used here preferably has a terminal amino group concentration ([$NH_2$]) of less than 100 microequivalent/g, which is more preferably 5 to 75 microequivalent/g, and even more preferably 10 to 60 microequivalent/g; meanwhile preferably has a terminal carboxy group concentration ([COOH]) of preferably less than 150 microequivalent/g, which is more preferably 10 to 120 microequivalent/g, and even more preferably 10 to 100 microequivalent/g. By using the polyamide resin having the thus controlled terminal group concentrations, the polyamide resin will tend to have stabilized viscosity when processed into film or fiber, and will tend to be more reactive with a carbodiimide compound described later.

Ratio of the terminal amino group concentration to the terminal carboxy group concentration ([$NH_2$]/[COOH]) is preferably 0.7 or smaller, more preferably 0.6 or smaller, and even more preferably 0.5 or smaller. If the ratio is larger than 0.7, it may become difficult to control the molecular weight of the polyamide resin during polymerization.

The terminal amino group concentration may be determined by dissolving 0.5 g of polyamide resin into 30 mL of a mixed solution of phenol/methanol (4:1) at 20 to 30° C. under stirring, and by titrating the solution with a 0.01 N hydrochloric acid. Meanwhile, the terminal carboxy group concentration may be determined by dissolving 0.1 g of polyamide resin into 30 mL of benzylalcohol at 200° C., and 0.1 mL of phenol red solution is added within the range from 160° C. to 165° C. The resultant solution is titrated with a titrating solution prepared by dissolving 0.132 g of KOH into 200 mL of benzylalcohol (0.01 mol/L KOH), wherein end point at which the color changes from yellow to red and remains unchanged thereafter, is determined for calculation.

Regarding method for manufacturing the polyamide resin, the description in paragraphs [0052] to [0053] of JP-A-2014-173196 may be referred to, the contents of which are incorporated by reference into this specification.

In this invention, the polyamide resin preferably has a melting point of 150 to 310° C., which is more preferably 180 to 300° C. When the polyamide resin used in this invention has two or more melting points, the higher one preferably satisfies the above described ranges.

The crystallization temperature during cooling is preferably 130 to 260° C., and more preferably 160 to 250° C.

Difference between the melting point and the crystallization temperature during cooling is preferably 20 to 60° C. Within the range, the polyamide resin may further be improved in impregnability into the continuous reinforcing fibers.

The polyamide resin preferably has a glass transition point of 50 to 100° C., which is more preferably 55 to 100° C., and even more preferably 60 to 100° C. Within these ranges, the heat resistance will tend to improve.

The melting point, crystallization temperature during cooling and glass transition point in this invention are temperatures observed by DSC (differential scanning calorimetry).

The differential scanning calorimetry may follow JIS K7121 and K7122. Using a differential scanning calorimeter, the polyamide resin is placed on a measurement pan of the differential scanning calorimeter, and the sample was heated in a nitrogen atmosphere at a heating rate of 10° C./min up to 300° C., and then cooled at a cooling rate of 10° C./min down to 30° C. for pre-treatment, followed by actual measurement. Under measurement conditions including a heating rate of 10° C./min, a hold time at 300° C. of 5 minutes, and a cooling rate of −5° C./min down to 100° C., the glass transition point, the crystallization temperature during cooling and the melting point are measured.

As the differential scanning calorimeter, employable is "DSC-60" from Shimadzu Corporation.

The material of this invention may contain a single type of, or two or more types of polyamide resin. When two or more types are contained, the individual physical values are understood to be those of mixed polyamide resin.

The polyamide resin used in this invention may contain other ingredients without departing from the spirit of this invention. Such other ingredients are exemplified by mold releasing agent, light stabilizer, heat stabilizer, elastomer, pigment, alkali, UV absorber, fluorescent brightener, anti-dripping agent, antistatic agent, anti-clouding agent, lubricant, anti-blocking agent, fluidity modifier, plasticizer, dispersion aid, and anti-bacterial agent. Two or more of these ingredients may be used together.

As for these ingredients, descriptions in paragraphs [0027], [0028], [0038] to [0054] of International Disclosure WO2012/128219, pamphlet; and descriptions of JP-A-2007-314766, JP-A-2008-127485, JP-A-2009-51989 and JP-A-2012-72338 may be referred to, the contents of which are incorporated by reference into this specification.

The material of this invention preferably contains 20 to 70% by mass of polyamide resin. The lower limit of the content of polyamide resin may be 30% by mass or above. The upper limit of the content of polyamide resin may be 60% by mass or below, even may be 55% by mass or below, yet may be below 50% by mass, and particularly may be 45% by mass or below.

<Continuous Reinforcing Fiber>

Next, the continuous reinforcing fiber used in this invention will be detailed.

The continuous reinforcing fiber used in this invention has a length of 10 cm or longer, which is preferably 1 m or longer. The upper limit value is not specifically limited, but may preferably be 10000 m or shorter from the viewpoint of easiness of winding on a core, which is more preferably 1000 m or shorter. The continuous reinforcing fiber used in this invention has a product form of roving.

Materials composing the continuous reinforcing fiber of this invention are exemplified by glass fiber, carbon fiber, plant fiber (including Kenaf fiber, bamboo fiber, etc.), alumina fiber, boron fiber, ceramic fiber, metal fiber (steel fiber, etc.), aramid fiber, polyoxymethylene fiber, polyparaphenylene bezobisoxazole fiber, and ultrahigh molecular weight polyethylene fiber. Among them, the material is preferably selected from carbon fiber and glass fiber, and glass fiber is more preferable.

The continuous reinforcing fiber having the surface treated with a surface treatment agent or sizing agent is also employable.

The amount of the continuous reinforcing fiber in the material of this invention is preferably 30 to 80% by mass of the material. The content of the continuous reinforcing fiber is preferably 40% by mass or above at the lowest, more preferably 50% by mass or above, and even more preferably 55% by mass or above. The upper limit of the content of continuous reinforcing fiber is preferably 80% by mass or below, and more preferably 70% by mass or below.

In the material of this invention, 90% by mass or more of the ingredients thereof are preferably composed of the polyamide resin and the continuous reinforcing fiber.

<Method for Manufacturing Material of this Invention>

The method for manufacturing a material of this invention includes impregnating the polyamide resin into the continuous reinforcing fibers. With such design, it is no more necessary to compound the polyamide resin with the continuous reinforcing fibers, and thereby the continuous reinforcing fibers may effectively be prevented from being broken during compounding. As a consequence, it will become possible to provide a formed article that excels in mechanical strength.

The polyamide resin used in this invention, when impregnated into the continuous reinforcing fibers, may have any form of fiber, powder and molten matter, wherein molten matter is preferable.

In one preferred embodiment of this invention, the molten polyamide resin is fed over the continuous reinforcing fibers juxtaposed unidirectionally, and then cooled. More specifically, the continuous reinforcing fiber bundles are arranged at regular intervals, the individual continuous reinforcing fiber bundles are opened, the opened continuous reinforcing fibers are allowed to pass through a pair of impregnation rolls together with the molten polyamide resin, so as to impregnate the polyamide resin into the continuous reinforcing fibers, the continuous reinforcing fibers are oriented in a predetermined direction, and then cooled. The continuous reinforcing fibers may be oriented in a predetermined direction in the material of this invention, for example by modifying conventional preset conditions, including tension of the continuous reinforcing fibers in the process of manufacturing, the number of spreaders used for flatness ratio the continuous reinforcing fibers, and the length of path over which the spreaders and the continuous reinforcing fibers are brought into contact. More specifically, although the continuous reinforcing fibers could be oriented more uniformly under stronger tension exerted during manufacturing, in this invention, the tension is purposely moderated to attain a desired orientation. The larger the number of spreaders, the more uniformly the continuous reinforcing fibers may be oriented. In this invention, the number of spreaders is, however, purposely reduced to thereby orient the fibers into a desired direction. In addition, the longer the length of path over which the spreaders and the continuous reinforcing fibers are brought into contact, the more uniformly the continuous reinforcing fibers may be oriented. In this invention, the length of path over which the spreaders and the continuous reinforcing fibers are brought into contact is purposely reduced, to thereby orient the fibers into a desired direction. Of course, any other methods may be used to control the orientation of the continuous reinforcing fibers, so long as they can orient the continuous reinforcing fibers in a desired direction.

The temperature at which the polyamide resin is allowed to melt is properly determined, taking the melting point of the polyamide resin, for example, into consideration. More specifically, although depending on types or molecular weight of the polyamide resin used in this invention, the temperature preferably falls within the range from a temperature 5° C. or more higher than the glass transition point of the polyamide resin used in this invention, to a temperature 5° C. lower than the heat decomposition temperature. When the polyamide resin showing a melting point is used in this invention, the temperature is preferably set to 5° C. or more higher than the melting point, which is more preferably 10° C. or more higher than the melting point. The upper limit is preferably 5° C. lower than the heat decomposition temperature of the polyamide resin. When the polyamide resin used in this invention shows two or more melting points, the melting point in this context means the temperature at which the peak top temperature of the endothermic peak on the higher temperature side.

The impregnation may be allowed to proceed under pressure. When pressurizing, the pressure is preferably 5 MPa or larger, more preferably 6 MPa or larger, and even more preferably 7 to 100 MPa.

Under heating and pressurizing within these ranges, the polyamide resin used in this invention will more suitably impregnated into the continuous reinforcing fibers, and the material and a formed article obtainable by forming such material will tend to have improved physical properties.

<Formed Article>

The material of this invention, although occasionally used as it is, is typically used as a formed article after forming, and preferably after heat forming. When used as the formed article, it is preferable to stack a plurality of materials, or, to stack the material with other resin material and so forth, followed by heat forming. When a plurality of materials are stacked, they are preferably stacked so as to cross the fiber-length directions (longitudinal directions) of the continuous reinforcing fibers in the materials at right angles. With such design, the obtainable formed article will have further improved mechanical strength. It is also preferable to cut the material of this invention into a desired shape or size, and a plurality of them may be stacked and formed under heating. When formed under heating, the formed article may also be obtained by placing the materials in molds for forming.

The heating temperature is preferably 5° C. or more higher than the melting point of the polyamide resin used in this invention, which is more preferably 10° C. or more higher than the melting point. The upper limit is preferably 5° C. lower than the heat decomposition temperature of the polyamide resin.

The pressure during pressurizing is preferably 1 MPa or larger, more preferably 3 MPa or larger, and even more preferably 5 to 100 MPa. A press machine of 80 to 120-t class is preferably used.

The formed article of this invention is not limited to final products, but also conceptually includes composite material and various parts. The formed article in this invention is preferably used for parts of mobile electronic devices, automobile parts, medical equipment parts, electronic parts containing other electric circuits, food and medical containers, and composite material for forming these articles. The formed article of this invention is particularly suitable for internal structures or enclosures of smartphone, tablet, flat-screen laptop computer and so forth, for its high impact resistance, rigidity and heat resistance, as well as small tendency of warping owing to its small anisotropy. The formed article is particularly suitable for flat plate type parts with an average thickness, excluding ribs, of 1.2 mm or smaller (the lower limit is typically, but not limited to 0.1 mm or above). The formed article of this invention can keep excellent flame retardance even if thinned, proving it to be highly valuable.

In addition, descriptions of JP-A-2011-219620, JP-A-2011-195820, JP-A-2011-178873, JP-A-2011-168705, JP-A-2011-148267 and JP-A-2015-224313 may be referred to, and the contents of which are incorporated by reference into this specification, without departing from the spirit of this invention.

EXAMPLES

This invention will more specifically be explained referring to Examples. Materials, amounts of consumption, ratios, details of processes and procedures of processes may suitably be modified without departing from the spirit of this invention. The scope of this invention is, therefore, by no means limited to the specific Examples below.

<Polyamide Resin>

MXD6: Metaxylylene adipamide resin S6001 from Mitsubishi Gas Chemical Company, melting point=237° C., crystallization temperature during cooling=173° C., number average molecular weight=16,800 PA6: Polyamide 6, Grade 1022B from Ube Industries, Ltd., melting point=224° C., crystallization temperature during cooling=189° C.

Synthesis of MPXD6

Into a 50 L reaction vessel equipped with a stirrer, a partial condenser, a condenser, a thermometer, a dropping funnel, a nitrogen feeding tube, and a strand die, placed were precisely weighed 6470 g (44.25 mol) of adipic acid, 12.54 g (0.074 mol) of calcium hypophosphite, and 6.45 g (0.079 mol) of sodium acetate, the inside of the reaction vessel was thoroughly replaced with nitrogen gas, and then pressurized with nitrogen gas up to 0.4 MPa, the content was heated under stirring from 20° C. to 190° C. so as to uniformly melt adipic acid over 55 minutes. Next, a mixture of 4172 g (30.63 mol) of metaxylylenediamine and 1788 g (13.13 mol) of paraxylylenediamine was added dropwise, during which the inner temperature of reaction vessel was continuously heated up to 270° C. During the dropwise addition, the pressure was controlled to 0.42 MPa, and released water was removed through the partial condenser and the condenser out of the system. Temperature of the partial condenser was controlled within the range from 145 to 147° C. After dropwise addition of the mixed diamine, the polycondensation reaction was allowed to continue at an inner pressure of 0.42 MPa for 20 minutes, during which the inner temperature was elevated up to 275° C. The inner pressure was then reduced over 30 minutes from 0.42 MPa down to 0.12 MPa, during which the inner temperature elevated up to 278° C. The reaction vessel was then evacuated at a rate of 0.002 MPa/min down to 0.08 MPa over 20 minutes, so as to control the content of ingredient having a molecular weight of 1,000 or smaller. Upon completion of evacuation, the internal temperature of reaction vessel was found to be 280°

C. The system was then pressurized with nitrogen gas, and while keeping the internal temperature of reaction vessel to 280° C. and the resin temperature to 279° C., the polymer was output through the strand die into strands, cooled in 20° C. cooling water, and pelletized. Approximately 10 kg of polyamide resin (occasionally referred to as "MPXD6", hereinafter) was obtained. The thus obtained MPXD6 was found to have a melting point of 255° C., a crystallization temperature during cooling of 195° C., and a number average molecular weight of 17,000.

Synthesis of MPXD10

Into a 50 L reaction vessel equipped with a stirrer, a partial condenser, a condenser, a thermometer, a dropping funnel, a nitrogen feeding tube, and a strand die, placed were precisely weighed 8950 g (44.25 mol) of sebacic acid, 12.54 g (0.074 mol) of calcium hypophosphite, and 6.45 g (0.079 mol) of sodium acetate, the inside of the reaction vessel was thoroughly replaced with nitrogen gas, and then pressurized with nitrogen gas up to 0.4 MPa, the content was heated under stirring from 20° C. to 190° C. so as to uniformly melt sebacic acid over 55 minutes. Next, a mixture of 4172 g (30.63 mol) of metaxylylenediamine and 1788 g (13.13 mol) of paraxylylenediamine was added dropwise, during which the inner temperature of reaction vessel was continuously heated up to 293° C. During the dropwise addition, the pressure was controlled to 0.42 MPa, and released water was removed through the partial condenser and the condenser out of the system. Temperature of the partial condenser was controlled within the range from 145 to 147° C. After dropwise addition of the mixed diamine, the polycondensation reaction was allowed to continue at an inner pressure of 0.42 MPa for 20 minutes, during which the inner temperature was elevated up to 296° C. The inner pressure was then reduced over 30 minutes from 0.42 MPa down to 0.12 MPa, during which the inner temperature elevated up to 298° C. The reaction vessel was then evacuated at a rate of 0.002 MPa/min down to 0.08 MPa over 20 minutes, so as to control the content of ingredient having a molecular weight of 1,000 or smaller. Upon completion of evacuation, the internal temperature of reaction vessel was found to be 301° C. The system was then pressurized with nitrogen gas, and while keeping the internal temperature of reaction vessel to 301° C. and the resin temperature to 301° C., the polymer was output through the strand die into strands, cooled in 20° C. cooling water, and pelletized. Approximately 13 kg of polyamide resin (occasionally referred to as "MPXD10", hereinafter) was obtained. The thus obtained MPXD10 was found to have a melting point of 213° C., a crystallization temperature during cooling of 162° C., and a number average molecular weight of 16,300.

<Continuous Reinforcing Fiber>

GF-1: RSG 60QM-483HS 600TEX from Nitto Boseki Co., Ltd., flattened glass fiber roving (fiber bundle of continuous reinforcing fibers of 10 m or longer). Oblong cross section with an average flatness ratio of 4, long diameter=28 µm, short diameter=7 µm, number average cross sectional area per continuous reinforcing fiber=185 pmt.

Example 1

<Manufacture of UD Tape>

A UD tape was manufactured according to the method below, using the polyamide resin and the continuous reinforcing fiber listed in Table below.

Twenty-two rolls of glass fiber (continuous reinforcing fiber) rovings were arranged at regular intervals, and the rovings were allowed to pass through spreaders to be widened to 200 mm in width. When the thus widened glass fibers were guided through a pair of vertically arranged impregnation rolls, the polyamide resin melted in a twin screw extruder (TEM26SS, from Toshiba Machine Co., Ltd.) was fed, thereby the polyamide resin was impregnated into the glass fibers in the impregnation rolls. The direction of orientation of the glass fibers was controlled by proper choices of the number of spreaders, and tension for unwinding the glass fibers. The glass fibers were then continuously taken up over a length of 50 m, while cooled on a cooling roll, wound on a cylindrical core, to obtain a UD tape. Preset temperature of the extruder was 40° C. higher than the melting point of the polyamide resin, the rotational speed was 350 rpm, and the take-up speed was 2 mm/min. The obtained UD tape was found to be 20 cm wide, 220 µm thick on average, and 50 m long. The obtained UD tape was evaluated as below.

<Measurement of Percentage of Continuous Reinforcing Fibers with an Angle α of Smaller than 20 Degrees, or 70 Degrees or Larger>

The percentage of the continuous reinforcing fibers that are inclined less than 20 degrees away from the direction perpendicular to the direction the continuous reinforcing fibers are juxtaposed (corresponded to the tape plane of UD tape) (denoted in Table 1 as "percentage of continuous reinforcing fiber at smaller than 20 degrees); and the percentage of the continuous reinforcing fibers that are inclined 70 degrees or more away from the direction perpendicular to the direction the continuous reinforcing fibers are juxtaposed (corresponded to the tape plane of UD tape) (denoted in Table 1 as "percentage of continuous reinforcing fibers at 70 degrees or larger"), were respectively measured according to the methods below.

The UD tape was cut perpendicularly to the longitudinal direction of the continuous reinforcing fiber, the cross sectional surface thereof was polished, and the cross sectional surface was then photographed under a ultra-deep color 3D shape analyzing microscope (VK-9500 (control unit)/VK-9510 (measurement unit) (from Keyence Corporation)). Five points in 250 µm×250 µm region were freely selected on the thus obtained cross sectional image, and angle α between the direction perpendicular to the direction the continuous reinforcing fibers are juxtaposed, and the long diameter of the continuous reinforcing fiber was measured for all continuous reinforcing fibers in each region. The percentage of the continuous reinforcing fibers with an angle α of smaller than 20 degrees, or exceeding 70 degrees was determined by (Area of continuous reinforcing fibers with angle α of smaller than 20 degrees, or exceeding 70 degrees)/(Area or all continuous reinforcing fibers) in the freely selected regions. Results are summarized in Table below. The values are given by 5% by area intervals. The percentage of the continuous reinforcing fibers with an angle α of smaller than 20 degrees, or 70 degrees or larger is given in "% by area".

<Anti-Piercing Force>

A needle with a 40 µm diameter tip was attached to a strograph, and was allowed to poke the material (UD tape) at a speed of 20 mm/s perpendicularly to the direction the continuous reinforcing fibers are juxtaposed, to find the maximum force at which the needle just pierces the material. The anti-piercing force is given as an averaged maximum force from measurements repeated five times, in N.

Strograph EII from Toyo Seiki Seisaku-sho, Ltd. was employed as the strograph.

<Surface Roughness Ra>

A 500 μm×500 μm area of the surface of the material (UD tape) was observed under an optical microscope. The surface roughness was calculated relative to the observed surface. The surface roughness was given in μm.

VK-X100 from Keyence Corporation was employed as the optical microscope.

<Tear Resistance>

Figure 5:
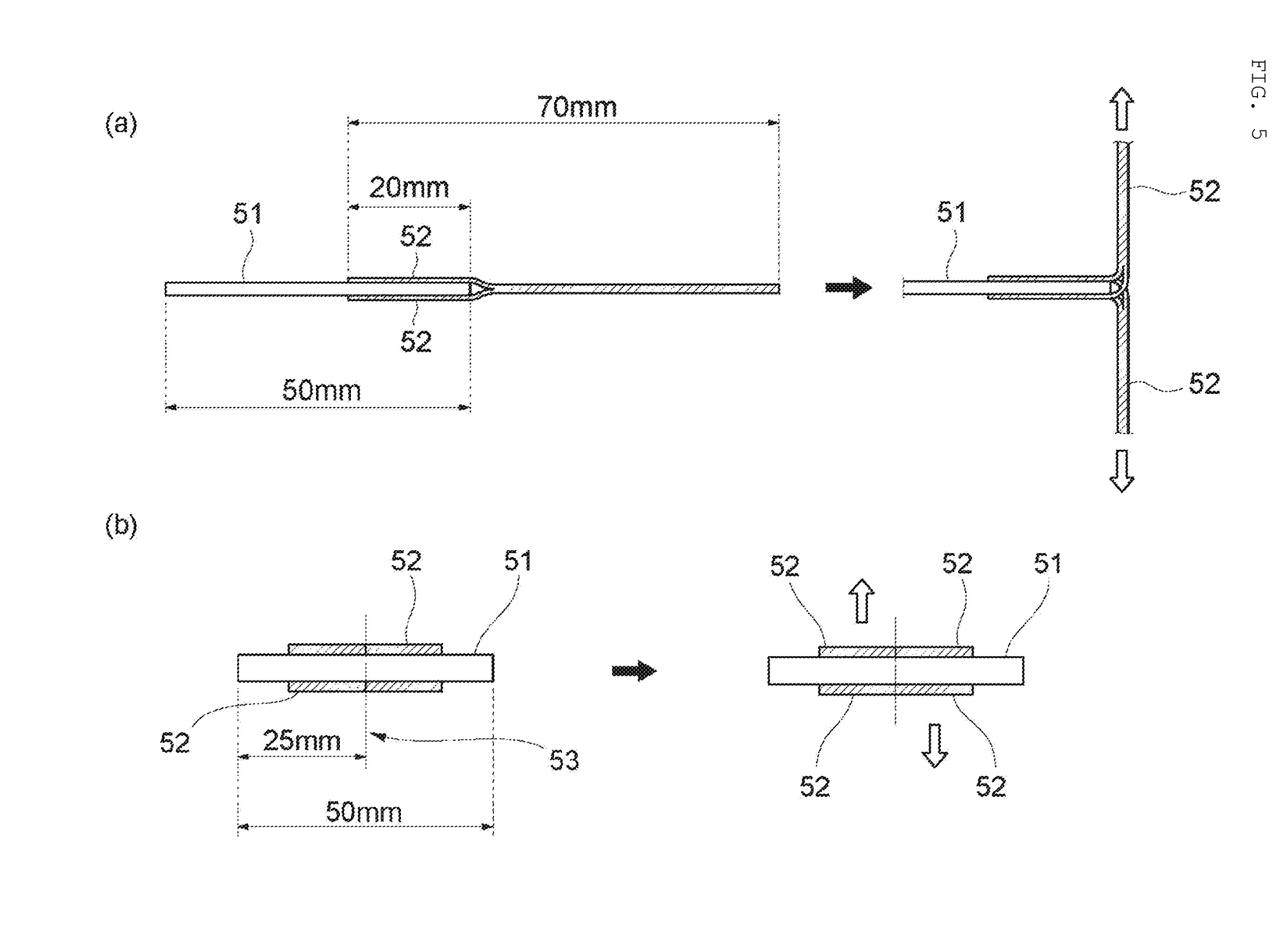
FIG. 5 is a schematic drawing illustrating a method for measuring tear resistance, explained in EXAMPLES.

As illustrated in FIG. 5, the material (UD tape 51) was cut into square pieces of 50 mm long in the fiber-length direction and 50 mm wide, a pair of metaxylylene adipamide (MXD6) films 52 of 15 mm wide, 70 mm long and 100 μm thick were bonded one by one onto the top and bottom surfaces of the material (UD tape) with an adhesive, so as to overlap them over a length of 20 mm, and residual portions of the MXD6 films 52 were bonded to each other with an adhesive. The MXD6 films 52 were provided so as to align one longitudinal side thereof in agreement with the center line 53 of the material in the fiber-length direction. Another pair of MXD6 films 52 were bonded to the surface of the material, having the films already bonded thereto, in the same way as the aforementioned pair of MXD6 films 52, so that the surfaces of the MXD6 films 52 are juxtaposed (but so as not to overlap each other, while keeping a space of several micrometers or around between the MXD6 films 52), and so as align one longitudinal side of the MXD6 films in agreement with the center line 53 of the material in the fiber-length direction. Chucks were attached to the individual bonded pairs of MXD6 films, and were pulled using a strograph as illustrated in FIG. 5 in the directions 180 degrees away from each other at a tensile speed of 300 mm/min, to find the maximum force at which the material (UD tape) tore. The measurement was repeated five times, and the results were averaged to give tear resistance. FIG. 5b is a cross sectional view of the material (UD tape) illustrated in FIG. 5a, taken along the direction perpendicular to the fiber-length direction, wherein FIG. 5a and FIG. 5b are given in different scales. The tear resistance is given in N.

The adhesive employed was 2082C from ThreeBond Co., Ltd., and the strograph employed was Strograph EII from Toyo Seiki Seisaku-sho, Ltd.

<Easiness of Separation of Continuous Reinforcing Fiber>

Easiness of separation of the continuous reinforcing fibers was evaluated as below. The continuous reinforcing fibers were stacked from the bottom at angles of 0 degree, 90 degrees and 0 degrees, using an automated fiber placement machine.

A: Stacked as intended, without causing tear of continuous reinforcing fibers during stacking.

B: Stacked as intended, although causing tear of part of continuous reinforcing fibers during stacking.

C: Not stacked as intended, causing large tear of continuous reinforcing fibers during stacking.

<Easiness of Unwinding>

Easiness of unwinding of the continuous reinforcing fibers were evaluated as below. The continuous reinforcing fibers were unwound using the automated fiber placement machine, at an unwinding speed of 10 m/min.

A: Continuous reinforcing fibers stably unwound without problem, during unwinding.

B: Continuous reinforcing fiber unwound without problem, with some resistance during unwinding.

C: Continuous reinforcing fiber not stably unwound, with large resistance during unwinding.

<Manufacture of Formed Article>

The above obtained UD tape was cut into pieces of 200 mm wide and 200 mm long, 18 pieces were stacked while alternatively rotating them by 90 degrees so that the glass fibers would be orthogonal, the stack was placed in dies heated at 30° C. higher than the melting point of the polyamide resin, and pressed using a 100 t press machine. After pressing, the dies were cooled by feeding water down to 80° C. and then opened. A formed article of 4.0 mm thick, composed of 18 tapes stacked therein, was obtained. Temperature of the dies during pressing was 30° C. higher than the melting point, the pressure was 100 kgf/cm$^2$ (9.8 MPa), the pressing time was 10 minutes, and the cooling time was 20 minutes.

<Overall Judgment>

Considering the various performances described above, the UD tapes were judged overall, from the viewpoint of practicability, and rated as A, B and C in a descending order of excellence. C represents a non-practical level.

A: Highly stable in operation, and usable without problem.

B: Usable without problem, although with occasional loading or audible sound of tape breakage during operation.

C: Not durable to continuous operation.

Examples 2 to 5, Comparative Example 1 and Comparative Example 2

All conducted in the same way as in Example 1, except that types of polyamide resin, types of continuous reinforcing fiber, percentage of continuous reinforcing fibers at smaller than 20 degrees in material, and the percentage of continuous reinforcing fibers at 70 degrees or larger were changed as summarized in Table 1.

TABLE 1

|  | Example 1 | Example 2 | Example 3 | Example 4 | Example 5 | Comparative Example 1 | Comparative Example 2 |
| --- | --- | --- | --- | --- | --- | --- | --- |
| Type of Polyamide Resin | MXD6 | MXD6 | MPXD6 | MPXD10 | PA6 | MXD6 | MXD6 |
| Type of Continuous Reinforcing Fiber | GF-1 | GF-1 | GF-1 | GF-1 | GF-1 | GF-1 | GF-1 |
| Amount of Continuous Reinforcing Fiber in material (% by mass) | 60 | 60 | 60 | 60 | 60 | 60 | 60 |
| Percentage of Continuous Reinforcing Fiber at smaller than 20 degrees (% by area) | 40 | 65 | 50 | 60 | 60 | 95 | 20 |
| Percentage of Continuous Reinforcing Fibers at 70 degrees or larger (% by area) | 20 | 5 | 15 | 10 | 5 | 0 | 40 |
| Anti-Piercing Force (N) | 10.5 | 9.1 | 9.9 | 8.8 | 8.7 | 7.9 | 11.6 |
| Surface Roughness, Ra (μm) | 19.2 | 12.5 | 16.1 | 14.0 | 13.8 | 6.4 | 23.9 |
| Tear Resistance (N) | 2.7 | 3.1 | 2.9 | 2.9 | 2.8 | 3.6 | 2.4 |
| Easiness of Separation of Continuous Reinforcing Fiber | B | A | A | A | B | A | C |
| Easiness of Unwinding | A | B | A | B | B | C | A |
| Overall Judgment | A | A | A | A | B | C | C |

All UD tapes of Example were found to have the polyamide resin impregnated almost up to the center of their thickness, showing an un-impregnation ratio of 1% or smaller.

As is clear from Table 1, when the percentage of continuous reinforcing fibers with an angle α of smaller than 20 degrees was 30 to 90% by area, the UD tapes were found to have large anti-piercing force, to have small surface roughness, to have large tear resistance, to be less likely to cause separation of the continuous reinforcing fibers, and to be easy to unwound (Examples 1 to 5). In contrast, when the percentage of continuous reinforcing fibers with an angle α of 20 degrees exceeded 90% by area (Comparative Example 1), the UD tape was found to have small anti-piercing force, and to be less easy to be unwound. When the percentage of continuous reinforcing fibers with an angle α of smaller than 20 degrees is less than 30% by area (Comparative Example 2), the UD tape was found to have large surface roughness, to have small tear resistance, and to be likely to cause separation of the continuous reinforcing fibers.

REFERENCE SIGNS LIST 11 non-circular cross section of continuous reinforcing fiber
21 continuous reinforcing fiber
51 UD tape
52 MXD6 film
53 center line of material

The invention claimed is:

1. A material comprising continuous reinforcing fibers that are juxtaposed unidirectionally, and having a polyamide resin impregnated therein,
wherein the continuous reinforcing fiber gives a non-circular cross sectional shape, when viewed perpendicularly to the longitudinal direction thereof, with a flatness ratio, given by long diameter (D2)/short diameter (D1), of 1.5 or larger, and
in at least one cross section of the material taken perpendicularly to the direction of the continuous reinforcing fibers being juxtaposed, the percentage of area occupied by the continuous reinforcing fibers, whose long diameter (D2) lying at an angle of less than 20 degrees away from the direction of the continuous reinforcing fibers being juxtaposed, is 30 to 90% by area of the continuous reinforcing fibers.

2. The material of claim 1,
wherein, in at least one cross section of the material taken perpendicularly to the direction of the continuous reinforcing fibers being juxtaposed, the percentage of area occupied by the continuous reinforcing fibers, whose long diameter (D2) lying at an angle of 70 degrees or larger away from the direction of the continuous reinforcing fibers being juxtaposed, is 70 to 5% by area of the continuous reinforcing fiber.

3. The material of claim 1, wherein the continuous reinforcing fiber is a glass fiber.

4. The material of claim 1, wherein the continuous reinforcing fiber has a cross sectional area, when viewed perpendicularly to the longitudinal direction, of 15 to 2000 $\mu m^2$ per a single continuous reinforcing fiber.

5. The material of claim 1, wherein the flatness ratio is 1.5 to 8.

6. The material of claim 1, wherein the material has a thickness of 10 to 2000 μm.

7. The material of any one of claim 1, wherein the polyamide resin contains a structural unit derived from diamine and a structural unit derived from dicarboxylic acid, and 50 mol % or more of the structural unit derived from diamine is derived from xylylenediamine.

8. The material of claim 1, wherein the continuous reinforcing fiber accounts for 30 to 80% by mass of the material.

9. The material of claim 1, having a surface roughness Ra of 22 μm or smaller.

10. The material of claim 1, having an anti-piercing force of 8.5 N; where the anti-piercing force is given as an averaged maximum force from measurements repeated five times, wherein a needle with a 40 μm diameter tip, attached to a strograph, is allowed to poke the material at a speed of 20 mm/s perpendicularly to the direction the continuous reinforcing fibers are juxtaposed, to find the maximum force at which the needle just pierces the material.

11. The material of claim 1, having a tear resistance of 2.5 N or larger; where the tear resistance is given as an averaged maximum force from measurements repeated five times, wherein the material is cut in 50 mm long in the fiber-length direction, a pair of resin films of 15 mm wide, 70 mm long and 100 μm thick are bonded one by one onto the top and bottom surfaces of the material with an adhesive, so as to overlap the resin films over a length of 20 mm, while aligning one longitudinal side of the resin films in agreement with the center line of the material in the fiber-length direction, and residual portions of the resin films are bonded to each other with an adhesive; another pair of resin films are bonded to the material in the same way as the aforementioned pair of resin films, while aligning one longitudinal side of the resin films in agreement with the center line of the material in the fiber-length direction; and the individual pairs of resin films are pulled in the directions 180 degrees away from each other at a tensile speed of 300 mm/min, to find the maximum force at which the material tears in the fiber-length direction.

12. The material of claim 1, being a UD tape.

13. A formed article obtained by forming the material described in claim 1.

14. The material of claim 2, wherein the polyamide resin contains a structural unit derived from diamine and a structural unit derived from dicarboxylic acid, and 50 mol % or more of the structural unit derived from diamine is derived from xylylenediamine.

15. The material of claim 3, wherein the polyamide resin contains a structural unit derived from diamine and a structural unit derived from dicarboxylic acid, and 50 mol % or more of the structural unit derived from diamine is derived from xylylenediamine.

16. The material of claim 2, wherein the polyamide resin contains a structural unit derived from diamine and a structural unit derived from dicarboxylic acid, and 50 mol % or more of the structural unit derived from diamine is derived from xylylenediamine; and
the continuous reinforcing fiber is a glass fiber.

17. The material of claim 1, wherein 90% by mass or more of ingredients of the material are composed of the polyamide resin and the continuous reinforcing fiber.

18. The material of claim 2, wherein 90% by mass or more of ingredients of the material are composed of the polyamide resin and the continuous reinforcing fiber.

19. The material of claim 1, wherein the continuous reinforcing fiber has a length of 1 m or longer.

20. The material of claim 1, wherein the material has a width of 1 to 100 cm, and a length of 1 to 1000 m.

* * * * *